US005282109A

United States Patent [19]

Smith

[11] Patent Number: 5,282,109

[45] Date of Patent: Jan. 25, 1994

[54] BACK-UP AIR GAPS

[75] Inventor: Thomas J. Smith, Bay Shore, N.Y.

[73] Assignee: TII Industries, Copiague, N.Y.

[21] Appl. No.: 67,602

[22] Filed: May 27, 1993

[51] Int. Cl.$^5$ .............................................. H02H 3/22

[52] U.S. Cl. .................................... 361/119; 361/129

[58] Field of Search ............... 361/127, 119, 120, 129; 337/28, 29

[56] References Cited

U.S. PATENT DOCUMENTS

| | | | |
|---|---|---|---|
| 4,649,456 | 3/1987 | DeLuca et al. | 361/119 |
| 4,866,561 | 9/1989 | Dorival | 361/119 |
| 5,224,013 | 6/1993 | Dagliuca | 361/119 |

*Primary Examiner*—Todd Deboer

*Attorney, Agent, or Firm*—Sachs & Sachs

[57] ABSTRACT

A miniature back-up overvoltage protection apparatus for use on an overvoltage protection device includes a housing adapted to be removably mounted on the first and second terminals of an overvoltage protection device. A dielectric is disposed within the housing and is sandwiched between two electrically conducting members done of which is in contact with one end terminal of the overvoltage protection device. A unitary clip is adapted to removable retain the overvoltage protection device and to urge a pair of back-up overvoltage protection apparatuses against the distal terminals of the overvoltage protection device with the clip making electrically conducting contact with the third terminal of the overvoltage protection device, the second conducting member and to the ground terminal of the telephone line system.

13 Claims, 2 Drawing Sheets

BACK-UP AIR GAPS

BACKGROUND OF THE INVENTION

1. Field of the Invention

The present invention relates to overvoltage surge arrestor assemblies for protecting telephone communication lines from overvoltage occurring thereon, and more particularly, to enhance surge voltage arrestor assemblies having back-up surge features in order to protect the communication lines.

2. Discussion of the Relevant Art

The most pertinent patent appears to be that to Huvet, U.S. Pat. No. 4,502,087, issued Feb. 26, 1985, which discloses a surge voltage assembly that includes a threaded tubular housing member coupled to a circuit ground and includes therein an axially aligned compression spring, metallic cage with extending resilient fingers, a solder pellet and a gas-filled tube having a primary arc gap and an insulator with secondary arc gap holes separating a pair of electrically conductive members which contacts one terminal of the gas-filled tube and a metallic cage to hold these items. A two terminal gas tube is used herein and thus it would require two of these assemblies to provide the same function as the instant invention and an entirely different mechanical construction.

The patent to Pagliuca, U.S. Pat. No. 4,150,414, issued Apr. 17, 1979, discloses a short circuit clip with legs for resiliently engaging a line and ground electrode of a gas tube arrestor and includes an air gap device at one set of legs. The device also uses a non-metallic fusible element interposed between the clip legs and associate arrestor electrode.

The patent to Masghati, et al, U.S. Pat. No. 5,029,302, issued on Jul. 2, 1991, discloses a fail-safe arrestor for electrical circuits that uses a gas filled tube to conduct an over-voltage and provides a clip to couple the circuit to a ground lead at the melting from continuous current flow of an insulator interposed between an electrode and the ground lead. The insulator is a mesh with a plurality of passages allowing arcing between the electrode and clip at or above a predetermined voltage, thus the ground lead is supplied for a vented gas-filled tube. A pair of these units would be required to accomplish protection for both the ring and tip circuits connected to telephone communication lines and a different mechanical arrangement.

The patent to Baumbach, U.S. Pat. No. 4,314,304, issued on Feb. 2, 1982, discloses a gas-tube surge arrestor and utilizes a secondary or back-up protector should the gas tube fail. The secondary air gap is established by perforated plastic sheets which are interposed between a line terminal and a ground contact both of which are supported on an insulated base. The means for holding the gas tube and the back-up overvoltage protection device require a plurality of brackets which is different than that shown in the instant invention.

The instant invention overcomes the shortcomings found in the prior art by providing an assembly which is suitable for use with a gas-filled tube or a solid state semiconductor overvoltage protection device having a configuration similar to the tube.

SUMMARY OF THE INVENTION

A miniature back-up overvoltage protection apparatus, according to the principles of the present invention, which may be utilized on an overvoltage protection device having three terminals. The first and second terminals are connected to the tip and ring terminals of a communication line with the third terminal being connected to a ground of the telephone line system. A housing that is adapted to be removably mounted on the overvoltage protection device includes a dielectric disposed therein and a through aperture. The first and second conducting members sandwich the dielectric therebetween with one of the conducting members making electrical conducting contact with the overvoltage protection device. A clip is adapted to removable retain a pair of overvoltage protection devices and urges one back-up voltage protection apparatus against a terminal of the overvoltage protection device. The clip makes electrical conducting contact with the ground terminal of the overvoltage protection device and one terminal of each of the conducting members.

An object of the present invention is to provide a miniature back-up overvoltage protection apparatus for use on an overvoltage protection device.

Another object of the present invention is to provide a back-up overvoltage protection apparatus suitable for affixing to the distal terminals of a three terminal overvoltage protection device providing a back-up air gap and may be readily adapted to include a overheating fail short mechanism.

Yet another object of the present invention is to provide an inexpensive, easily assembled overvoltage protection apparatus.

Still yet another object of the present invention is to provide a miniature back-up overvoltage protection apparatus which may be readily replaced in the field when an overvoltage has destroyed it.

The foregoing and other objects and advantages will appear from the description to follow. In the description reference is made to the accompanying drawing which forms a part hereof, and in which is shown by way of illustration two specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims in order to make the invention more readily understandable and like references characters refer to like elements.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
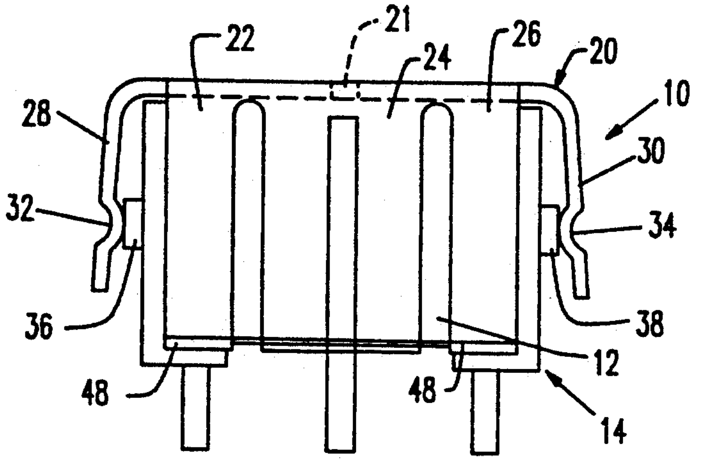
FIG. 1, is a view in elevation of a back-up overvoltage protection apparatus, according to the principles of the present invention, mounted in a grounding clip.

Referring now to the figures, and in particular FIG. 1, there is shown a miniature back-up overvoltage protection apparatus according to the principles of the present invention, for use on an overvoltage protection device 12 such as a gas tube or a solid state device having the same mechanical configuration. The gas tube 12 with the miniature back-up air gap apparatus 14 disposed on both ends 16 and 18 of the gas tube or solid state device 12. Hereinafter when reference is made to a gas tube it is to be understood that a solid state device having a similar mechanical construction may be utilized in lieu thereof.

A ground clip 20 is provided with a plurality of fingers 22, 24 and 26, which are arcuate in shape and are adapted to receive the gas tube 12 therein. The ground clip 20 is also provided with a pair of end fingers 28 and 30 and an aperture 21 suitable for receiving an eyelet or rivet therein, not shown, so that the clip 20 may be affixed to a ground terminal. The end fingers 28 and 30 are provided with dimples 32 and 34, which extend inwardly so that they may insert pressure on electrically conductive contacts 36 and 38 of the back-up air gap apparatus 14.

Figure 2:
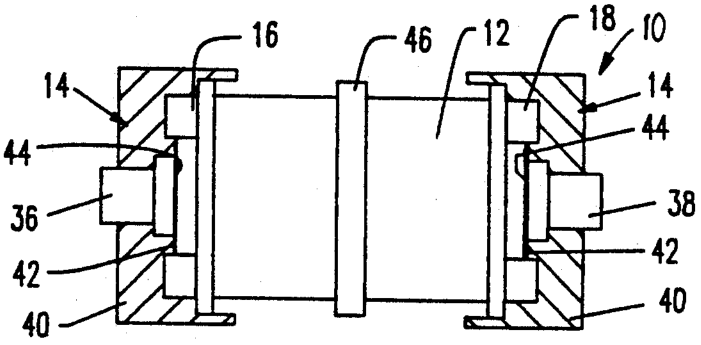
FIG. 2, is a view, partially in cross section, of the apparatus shown in FIG. 1.

Referring now to FIG. 2, there is shown a pair of back-up air gap apparatuses 14 positioned on the ends 16 and 18 of the gas tube 12. Each back-up air gap apparatus 14 includes a non-conductive housing 40, which is preferably circular in shape and adapted to be received by the ends 16 and 17 provided on the gas tube 12 The housing 40 is provided with a ledge 42 onto which is placed a dielectric material 44 preferably made of Kapton or mylar having a thickness of 0.008 to 0.0010 inches. Electrically conductive contact 36 and 38 are flush with the conducting contacts 36 and 38 and the end terminals of the gas tube 12. The third or centrally disposed terminal 46 of the gas tube 12 is connected by means, not shown, to the ground terminal of the telephone line system, also not shown.

Figure 3:
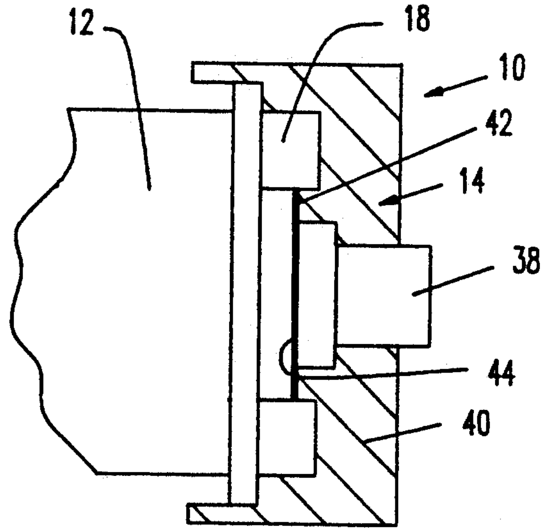
FIG. 3, is a greatly enlarged, partial view, in cross section of the apparatus shown in FIG. 2.

FIG. 3 is an enlarged partial view of the assembly showing the configuration of the back-up air gap apparatus 14.

In operation, the ground clip 20 is affixed to a terminal board or a metal conducting contact which is connected to ground. The back-up air gap apparatus 14 is placed on both ends 16 and 18 of the gas tube 12 and then slipped into the ground clip 20 wherein the dimples 32 and 34 make electrical conducting contact with contacts 36 and 38, which is separated from the end terminals 16 and 18 of the gas tube 12 by a dielectric 44 positioned on the ledge 42 of the housing 40. The two end terminals of the tube 12 are connected to the tip and ring terminals of the telephone line system and are insulated from ground by a non-metallic element 48, known in the art, is placed between the fingers 22, 26, 56 and 60 and the gas tube 14 so that the gas tube terminals will not short to ground unless the element 48 melts because of overheating.

Figure 4:
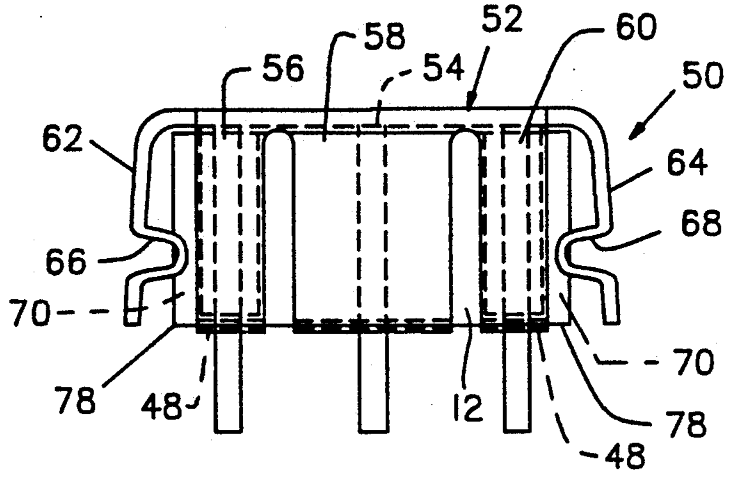
FIG. 4, is a view in elevation of an alternative embodiment of the miniature back-up overvoltage protection apparatus mounted within a mounting clip.
Figure 5:
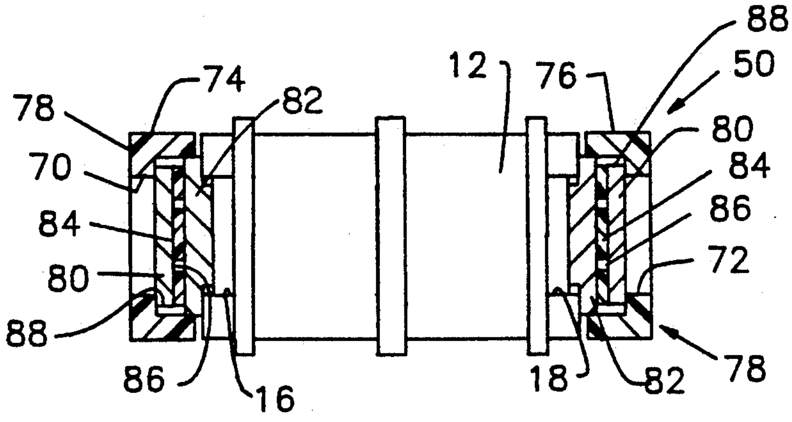
FIG. 5, is a view in elevation of the apparatus shown in FIG. 4 shown partially in cross section.
Figure 7:
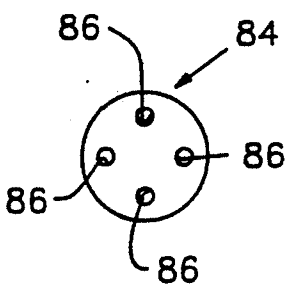
FIG. 7, is a top plan view of the insulating disc member.

Referring now to FIG. 4, which discloses an alternative embodiment of a back-up air gap apparatus 50, which includes a ground clip 52 that is similar to the ground clip 20 described earlier. An aperture 54 is provided so that a rivet, eyelet or other mechanical means may be used to affix the ground clip 52 to a terminal board or a conductive surface that is connected to a ground, not shown. The ground clip 52 also includes a plurality of fingers 56, 58 and 60 as well as end fingers 62 and 64. End fingers 62 and 64 are provided with an enlarged dimple which extends through an aperture 70 provided in the housing 74 and 76. The housing 74 and 76 are part of a back-up air gap apparatus 78, that includes electrically conductive members 80 and 82, which sandwich an insulating disk member 84 that is provided with a plurality of apertures 86. Insulating disk member 84 is preferably provided with four apertures and is shown more clearly in FIG. 7. Electrically conductive members 80 and 82 are adhesively affixed to both sides of the insulating disk member 84, thereby providing a completely sealed air gap 86. The sandwich of conducting member 80 is positioned to sit on a ledge 88 provided in the housing 74. The electrically conducting member 82 is adapted to be received into the conducting end terminals 16 and 18 of the tube 12 and electrically conducting members 82 and 84 are in electrically conducting contact with the end terminal 16 and 18 and retains the back-up air gap device thereon.

Figure 6:
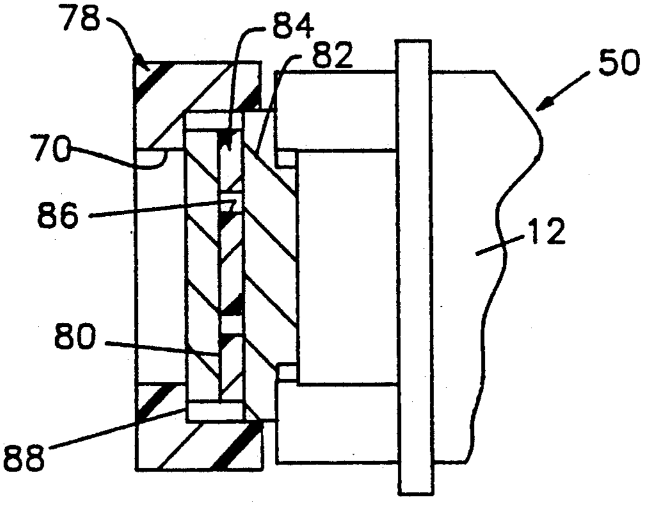
FIG. 6, is a greatly enlarged cross-sectional view of the apparatus shown in FIG. 5.

Referring now to FIG. 6 which is a greatly enlarged partial view of the back-up air gap apparatus 78 affixed to the gas tube 12.

In operation a pair of back-up air gap apparatuses 78 are affixed on the ends of the tube 12 with one electrically conductive member 82 being in electrically conductive contact with the end conducting portion of tube 12 and is inserted into the ground clip 52 protruding dimples 62 and 68 extend through the aperture 70 and make electrically conductive contact with the other conducting member 80 of the sandwich thereby providing a path to ground from both the ring and tip terminals which are in electrically conductive contact with the conducting elements 82 via the apertures 86 provided in the insulating member 84. As stated earlier, a non-metallic element 48 known in the art, is placed between the fingers 22, 26, 56 and 60 and the gas tube 14 so that the gas tube terminals will not short to ground unless the element 48 melts because of overheating.

It is to be noted that the conducting members 80 and 82 may be adhesively affixed to the dielectric or insulating member 84 sealing the apertures 86 so they are not subject to atmospheric interference.

Hereinbefore has been disclosed a miniature back-up surge protector apparatus, which may be removably affixed to a gas tube or solid state overvoltage device and may be preassembled prior to assembly into a ground clip. Moreover, both embodiments disclosed herein include the use of a non-metallic electrically insulated composition to be inserted beneath fingers 22, 26, 56 and 60 to insulate the ground clip fingers from coming into contact with the tube or solid state device and terminals. Upon overheating the material melts providing a fail safe ground on the end terminals, which will connect to the tip and ring circuits of the telephone line system. It will be understood that various changes in the details, materials, arrangement of parts and operating conditions which have been herein described an illustrated in order to explain the nature of the invention may be made by those skilled in the art within the principles and scope of the instant invention.

Having thus set forth the nature of the invention what is claimed is:

1. A miniature back-up overvoltage protection apparatus for use on a overvoltage protection device having a first terminal, a second terminal and a third terminal, said first and said second terminals being disposed proximate the distal ends of said overvoltage protection device, with said first terminal being connected to the tip terminal, said second terminal being connected to the ring terminal and said third terminal being connected to the ground terminal of a telephone line system, comprising in combination:

a) housing means adapted to be removably mounted on said first and said second terminals of said overvoltage protection device, said housing means being provided with an internal circumscribing ledge and a centrally disposed through aperture;

b) dielectric means disposed within said housing means;

c) first and second conducting means sandwiching said dielectric means therebetween, said first conducting means making electrical conducting contact with said overvoltage protection device first or second terminal; and d) unitary clip means adapted to removably retain said overvoltage protection device and to urge one back-up overvoltage protection apparatus against the first terminal of said overvoltage protection device and a second back-up overvoltage protection against the second terminal of said overvoltage protection device, said clip means making electrical conducting contact with said third terminal of said overvoltage protection device, said second conducting means and to said ground terminal of said telephone line system.

2. A miniature back-up overvoltage protection apparatus for use on a telephone line system according to claim 1, wherein said dielectric means is provided with a plurality of through apertures.

3. A miniature back-up overvoltage protection apparatus for use on a telephone line system according to claim 1 , wherein said first conducting means and said overvoltage device second terminal are one and the same.

4. A miniature back-up overvoltage protection apparatus for use on a telephone line system according to claim 1, wherein said second conducting means protrudes through said housing through aperture.

5. A miniature back-up overvoltage protection apparatus for use on a telephone line system according to claim 1, wherein said first conducting means is adapted to be received within depressions provided within the distal edges of said overvoltage protection device.

6. A miniature back-up overvoltage protection apparatus for use on a telephone line system according to claims 1 or 2, wherein said dielectric is Kapton.

7. A miniature back-up overvoltage protection apparatus for use on a telephone line system according to claim 3, wherein said dielectric means is relatively thin.

8. A miniature back-up overvoltage protection apparatus for use on a telephone line system according to claim 1, wherein said dielectric means is relatively thick and is provided with a plurality of through apertures.

9. A miniature back-up overvoltage protection apparatus for use on a telephone line system according to claim 2, wherein said dielectric means is relatively thick.

10. A miniature back-up overvoltage protection apparatus for use on a telephone line system according to claim 1 further including temperature sensitive insulation means disposed between said first terminal of said overvoltage protection device, said second terminal of said overvoltage protection device, and said clip means to prevent shorting therebetween except when said insulation means melts upon exposure to excessive heat.

11. A miniature back-up overvoltage protection apparatus for use on a telephone line system according to claim 1, wherein said overvoltage protection device is a gas tube.

12. A miniature back-up overvoltage protection apparatus for use on a telephone line system according to claim 1 wherein said overvoltage protection device is a solid state device.

13. A miniature back-up overvoltage protection apparatus for use on a telephone line system according to claim 2, wherein said through apertures are sealed by means of an adhesive means for causing of said first and second conducting means to permanently adhere to said dielectric means.

* * * * *